United States Patent
Cooper

(10) Patent No.: US 6,295,868 B1
(45) Date of Patent: Oct. 2, 2001

(54) REAL-TIME SNOW LOAD MEASURING SYSTEM

(76) Inventor: Christopher Cooper, P.O. Box 11181, Truckee, CA (US) 96161

( * ) Notice: Subject to any disclaimer, the term of this patent is extended or adjusted under 35 U.S.C. 154(b) by 0 days.

(21) Appl. No.: 09/566,146

(22) Filed: May 5, 2000

(51) Int. Cl.⁷ .................................................. G01W 1/100
(52) U.S. Cl. .................................. 73/170.23; 73/862.581
(58) Field of Search .......................... 73/170.16, 170.17, 73/170.21, 170.23, 862.581

(56) References Cited

U.S. PATENT DOCUMENTS

| | | | |
|---|---|---|---|
| 3,698,492 | * 10/1972 | Lejeune | 177/1 |
| 3,752,245 | * 8/1973 | Johnson | 177/208 |
| 3,791,375 | * 2/1974 | Pfeiffer | 600/592 |
| 4,219,090 | * 8/1980 | Dayton | 177/208 |
| 4,852,675 | * 8/1989 | Wang | 177/208 |
| 5,886,301 | * 3/1999 | Preble | 177/1 |

* cited by examiner

*Primary Examiner*—Max Noori
(74) *Attorney, Agent, or Firm*—Goldstein Law Offices, P.C.

(57) ABSTRACT

A real-time snow load measuring system, for determining when an unsafe condition exists upon a roof top surface of a dwelling, having a sensor unit and a control unit. The sensor unit is mounted on the roof top surface, and includes a frame having a base plate and a sensor plate. A fluid substance is located between the base plate and sensor plate, such that the fluid substance is compressed, creating a fluid pressure, upon the presence of a snow load upon the sensor plate. A transducer is in communication with the fluid substance, and is capable of measuring the fluid pressure and producing a transducer output which is proportional to actual snow loading upon the sensor plate. The control unit receives the transducer output, provides a calibrated output on its display unit reflecting average snow loading on the roof top surface, and can also produce a warning when a predetermined maximum permissible roof loading level has been exceeded.

5 Claims, 2 Drawing Sheets

REAL-TIME SNOW LOAD MEASURING SYSTEM

BACKGROUND OF THE INVENTION

The invention relates to a real-time snow load measuring system. More particularly, the invention relates to a system which is installed onto a roof top surface for continuously monitoring and reporting the snow load thereon.

The accumulation of snow is most often thought to be problematic only for the transportation and mobility needs of a society. However, to those who maintain buildings in climates where snow is abundant, the accumulation of snow on rooftops can be a great cause for concern.

Rooftops are ordinarily designed to withstand the elements, and occasional light loading. However, since they are typically not loaded, they are often built to withstand relatively low loading when compared to living areas. Since they are not likely to be loaded on a regular basis, the acceptable design loading is a compromise between the desire to make any building a strong as possible, and the desire to keep construction costs reasonable. Accordingly, the architect, in accordance with local building codes, will specify a maximum loading for the rooftop surface.

When snow accumulates on roof tops, building managers and homeowners alike grow concerned as to whether the maximum loading is exceeded. Although certain rules of thumb may be employed to estimate the weight of a certain layer of snow by its thickness, a layer of ice or wet slush can greatly skew such estimates, and can rapidly increase loading to dangerous levels. In addition, without a monitoring system in place, a dangerous condition can easily escape the attention of the building manager or homeowner until it is too late.

SUMMARY OF THE INVENTION

It is an object of the invention to produce a real time snow load measuring system which is capable of measuring the actual snow loading on a roof top surface in the location of the invention. Accordingly, the system employs a sensor unit which is permanently installed onto the roof top surface, so that the accumulation of snow and ice upon its sensor unit can be measured to determine the approximate loading on the remainder of the roof top surface.

It is another object of the invention to provide a real time snow load measuring system which provides the results of its load measurement in a meaningful and useful way. Accordingly, a display is provided which can be monitored by the user. In addition, the device may be easily linked to alarm units or other electronic control systems to provide a warning alert when set loading limits are reached or exceeded.

It is a further object of the invention to provide a real time snow load measuring system which is reliable and has a long useful life. Accordingly, the sensor unit has a simplistic two plate construction whose simplicity dictates few maintenance requirements and a low probability of failure.

The invention is a real-time snow load measuring system, for determining when an unsafe condition exists upon a roof top surface of a dwelling, comprising a sensor unit and a control unit. The sensor unit is mounted on the roof top surface, and includes a frame having a base plate and a sensor plate. A fluid substance is located between the base plate and sensor plate, such that the fluid substance is compressed, creating a fluid pressure, upon the presence of a snow load upon the sensor plate. A transducer is in communication with the fluid substance, and is capable of measuring the fluid pressure and producing a transducer output which is proportional to actual snow loading upon the sensor plate. The control unit receives the transducer output, provides a calibrated output on its display unit reflecting snow loading on the roof top surface where the sensor unit is mounted, and can also produce a warning when a predetermined maximum permissible roof loading level has been exceeded.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
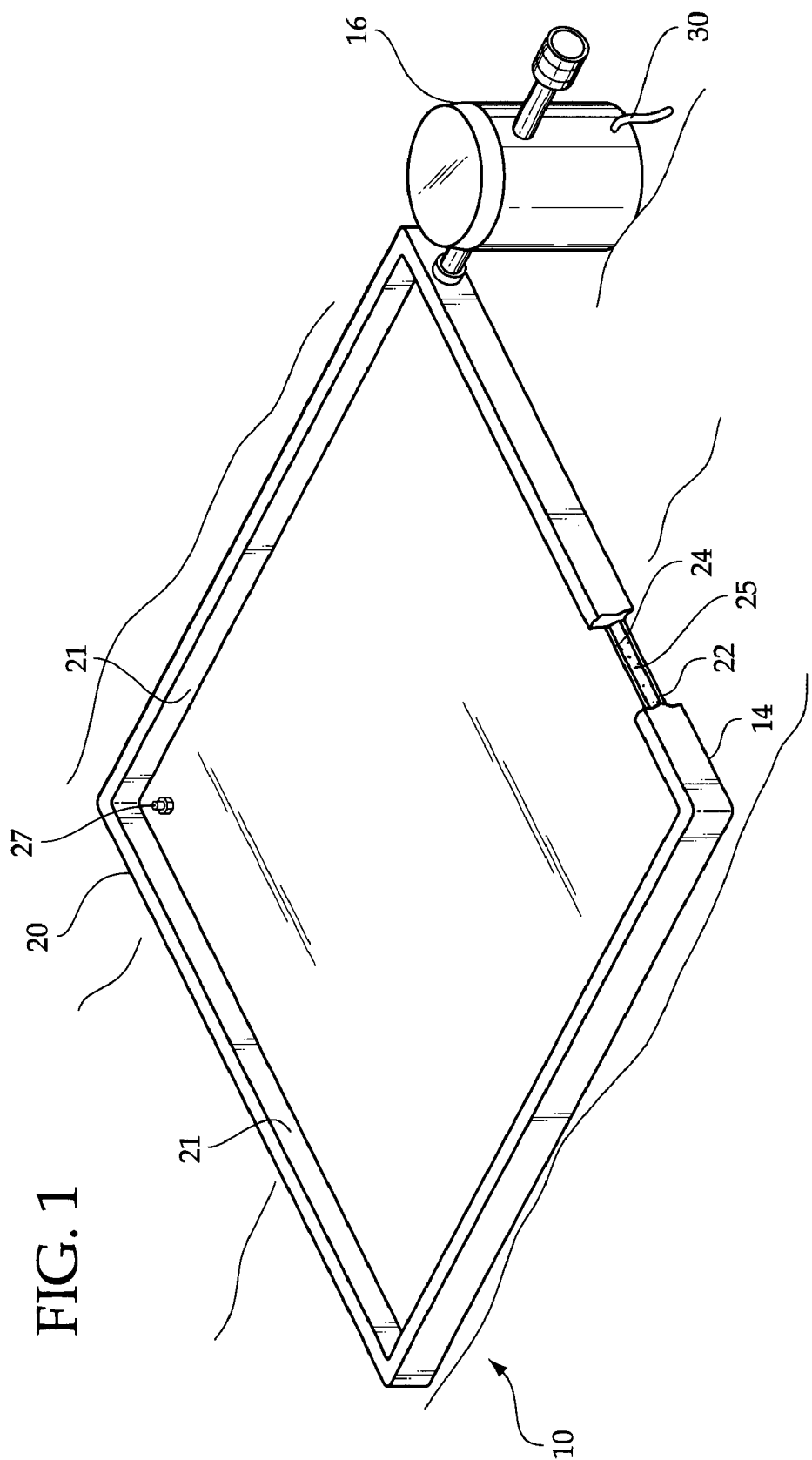
FIG. 1 is a diagrammatic perspective view, illustrating the sensor mounted in place on a rooftop surface.

FIG. 1 illustrates a sensor unit 10 which is a portion of the real-time snow load measuring system. The sensor unit 10 includes a sensor element 14 and a transducer 16.

The sensor element 14 includes a generally square frame 20 having frame inner walls 21 and a base plate 22. A sensor plate 24 is mounted within the frame and sized so that it can easily move slightly upward and downward within the frame 20 with respect to the base plate 22. The frame 20 is preferably approximately three feet by three feet to ensure a sufficient sampling of roof top snow accumulation to provide a good average snow loading measurement.

A fluid substance 25 is located between the sensor plate 24 and base plate 22. The frame inner walls 21, base plate 22 and sensor plate 24 are constructed so that the fluid substance 25 remains trapped between the base plate 22 and sensor plate 24 despite changing pressure upon the sensor plate 24 and slight motion of the sensor plate 24 as a result thereof. By a preferred manner of construction, the base plate 22 and sensor plate 22 are connected and welded together along their perimeters into a "pillow", which fully encases the fluid therebetween in an internal cavity formed thereby. A fill plug 27 is provided at the sensor plate 24, to allow the fluid substance 25 to be added to an optimal level within the internal cavity. The fluid substance should be one which has a low susceptibility to thermal expansion, and which will not freeze or boil, even when subjected to abnormal climate conditions. Accordingly, a preferred chemical for use as the fluid substance is glycol. A preferred material for the sensor plate 24 and base plate 22 is stainless steel.

The transducer 16 is connected to the frame 12 such that it maintains fluid communication with the fluid substance 25 located between the sensor plate 24 and base plate 22. According to the present invention then, when downward pressure is exerted upon the sensor plate 24, the fluid substance 25 therebeneath is pressurized, and therefore has a fluid pressure. The transducer 16 measures the fluid pressure and produces a transducer output 30. The transducer output 30 is proportional with the fluid pressure, and is therefore proportional with pressure exerted on the sensor plate 24.

Figure 2:
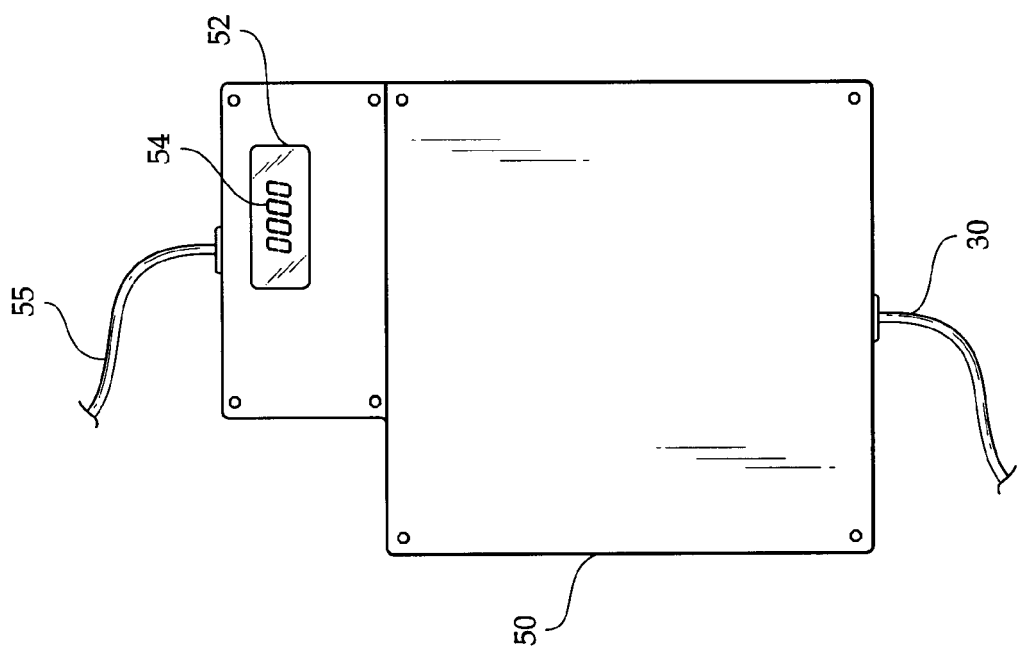
FIG. 2 is a front elevational view, illustrating a monitoring and control unit according to the present invention.

As snow accumulates upon the sensor plate 24, the sensor plate 24 will deflect downward, the fluid substance 25 is thereby compressed, and the transducer will measure an increase in pressure. Accordingly, the transducer output 30 can be calibrated to provide an average load for the roof top surface which should have a similar snow accumulation thereupon. Referring to FIG. 2, the measuring system includes a control unit 50, having a display 52. The transducer output 30 is connected to the control unit 50. Once the transducer output is processed by the control unit 50, the display 52 can produce a calibrated output 54 of the average snow load according to any desired calibration system. Further, the control unit 50 can be set with a predetermined maximum permissible roof loading level. When the calibrated output exceeds that maximum loading level, the control unit 50 determines an alert condition and can generate a warning output 55, which may be connected to an annunciator, a computer monitoring system, or an alarm system.

Figure 3:
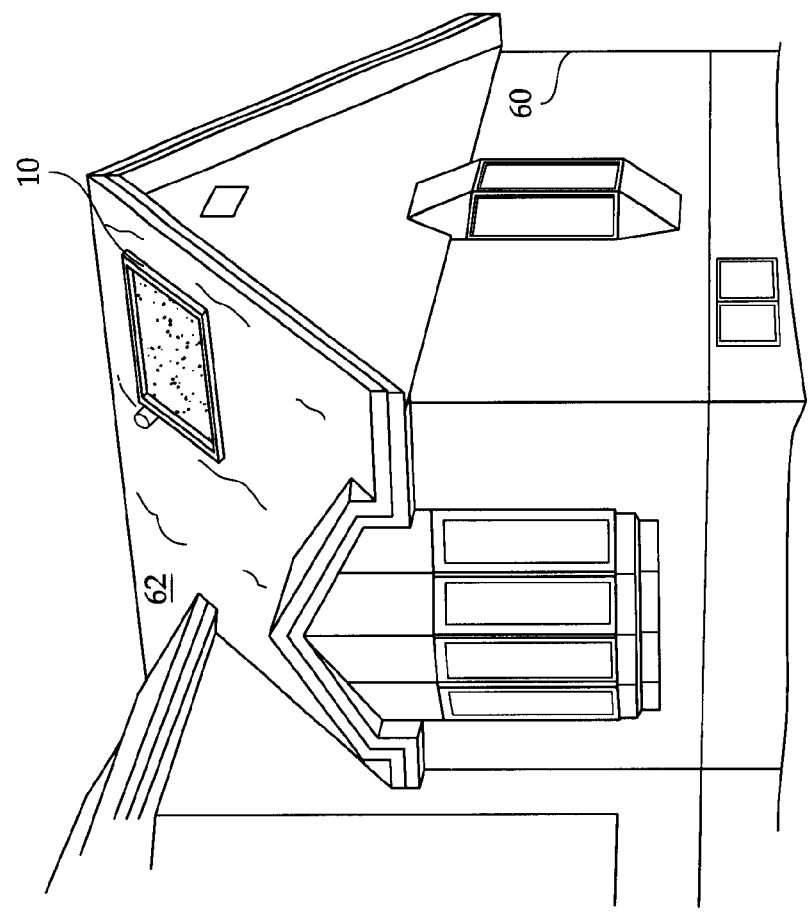
FIG. 3 is a diagrammatic perspective view, illustrating an example mounting of the sensor unit on a sloped rooftop surface.

FIG. 3 illustrates an exemplative mounting of the measuring system on a dwelling 60 having a sloped rooftop surface 62. By this example, the sensor unit 10 is mounted onto the sloped rooftop surface 62 wherein the sensor unit 10 extends parallel to the rooftop surface. Empirical testing will determine if the most accurate loading measurement is obtained by mounting the sensor unit 10 parallel to the roof surface as shown in FIG. 3, or simply horizontally, despite a sloping roof. The sensor unit 10 can easily be mounted horizontally, if appropriate, by using adjustable legs.

In conclusion, herein is presented a system for providing continuous real-time measurement of roof top snow loading, so as to easily and accurately determine whether a dangerous condition exists. The inventive concept has been illustrated by example in the form shown in the various drawing figures. However, numerous variations are possible while remaining true to the inventive concept. Such variations are therefore themselves considered to be part of the inventive concept disclosed herein.

What is claimed is:

1. A real-time snow load measuring system, for use with a dwelling having a rooftop surface, comprising:

a frame, having a base plate and frame inner walls, the frame is mountable upon the rooftop surface;

a sensor plate mounted between the frame inner walls above the base plate for vertical movement with respect to the base plate;

a fluid substance located between the sensor plate and base plate which is compressible by the sensor plate to create a fluid pressure upon the presence of pressure upon the sensor plate; and a transducer, attached to the frame such that the transducer is in communication with the fluid substance, the transducer having a transducer output which is proportional to the fluid pressure of the fluid substance for providing a measurement of snow loading upon the sensor plate.

2. The real-time snow load measuring system as recited in claim 1, wherein the fluid substance is glycol and the sensor plate and base plate are made of stainless steel.

3. The real-time snow load measuring system as recited in claim 2, further comprising a control unit having a display, the transducer output connected to the control unit, the control unit producing a calibrated result on the display in response to the transducer output.

4. The real-time snow load measuring system as recited in claim 3, wherein the roof top surface has a predetermined maximum permissible roof loading level, and wherein the control unit indicates an alert condition when the calibrated result exceeds the predetermined maximum permissible roof loading level.

5. The real-time snow load measuring system as recited in claim 4, wherein the frame is substantially square and approximately three feet by three feet in size.

\* \* \* \* \*